M. B. McMANUS.
Bull Wheels for Artesian Wells.

No. 155,740.  Patented Oct. 6, 1874.

Henry E. Wrigley
O. W. Grass.
Witnesses

Inventor.
Michael B. McManus

UNITED STATES PATENT OFFICE.

MICHAEL B. McMANUS, OF TITUSVILLE, PENNSYLVANIA.

IMPROVEMENT IN BULL-WHEELS FOR ARTESIAN WELLS.

Specification forming part of Letters Patent No. 155,740, dated October 6, 1874; application filed March 30, 1874.

*To all whom it may concern:*

Be it known that I, MICHAEL B. McMANUS, of Titusville, in the county of Crawford, State of Pennsylvania, have invented an Improved Sectional Bull-Wheel for Artesian Wells, of which the following is a specification:

The object of my invention is to construct a bull-wheel in such a manner that it may be readily taken apart for convenience of transportation, and put together at the place where it is intended to be used.

Figure 1:
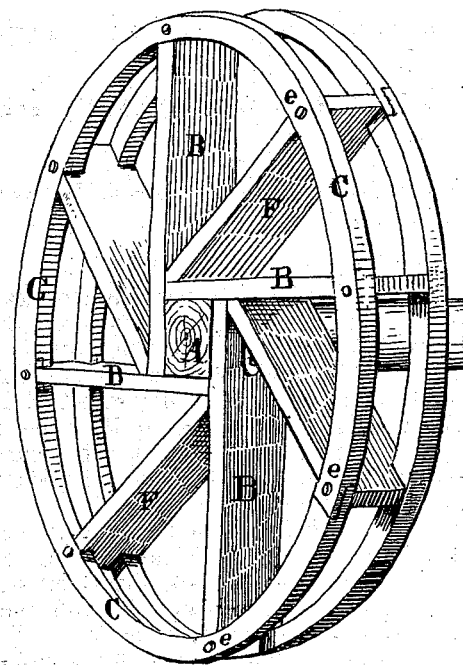
Figure 2:
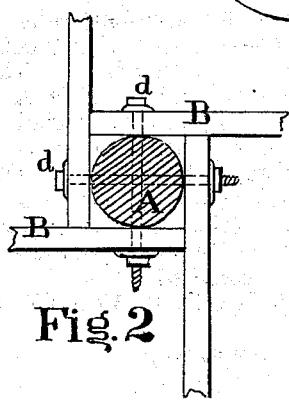
Figure 3:
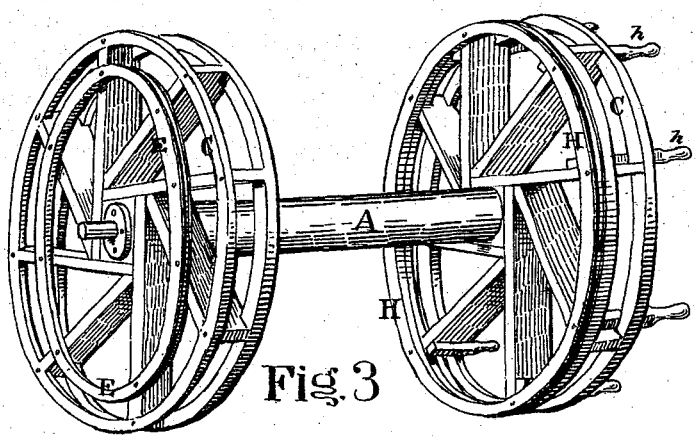

In the accompanying drawing, Figure 1 is a perspective view of one wheel, showing the shaft, arms, and the main or outer rims. Fig. 2 is a transverse section of the shaft, showing the method of securing to it the principal arms. Fig. 3 is a general perspective view of an entire bull-wheel, completed in the manner herein described.

A is the shaft of the bull-wheel turned to a cylinder between the wheels, but having a square head left upon each end. Upon this head the principal arms B B are secured by the bolts d d. Between the principal arms are placed the auxiliary arms F F, the ends of all the arms being notched to receive the rims, which are made of hard wood steamed and bent in one piece, or in sections of convenient length, with the ends scarfed or lapped, as shown, and secured to the arms by a screw or bolt, e e, as may be desired.

The rims for the brake-wheel H H, Fig. 3, and the rope pulley-wheel E E, Fig. 3, are made and secured in the same manner. The handles h h, Fig. 3, are secured by bolts or screws in the angle between the arms and rims, as shown.

With this manner of construction the shaft, arms, rims, and handles can be readily separated for transportation or storage, and the wheel rebuilt whenever and wherever desired.

I claim as my invention—

1. A bull-wheel for artesian wells, constructed of the wooden rims C E H, bent into the required shape, and combined with the radiating arms B, and hub or axle A, substantially as and for the object specified.

2. A bull-wheel for artesian wells, constructed of the sections A, B, C, E, F, and H, each capable of being detached one from the other, for transportation, and fitted or adjusted together for operation, substantially as herein shown and described.

MICHAEL B. McMANUS.

Witnesses:
   HENRY E. WRIGLEY,
   C. W. GRASS.